US009242558B2

(12) United States Patent
Handa

(10) Patent No.: US 9,242,558 B2
(45) Date of Patent: Jan. 26, 2016

(54) ELECTRICITY SUPPLY VEHICLE

(71) Applicant: MITSUBISHI JIDOSHA KOGYO KABUSHIKI KAISHA, Tokyo (JP)

(72) Inventor: Kazunori Handa, Nishio (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 544 days.

(21) Appl. No.: 13/683,782

(22) Filed: Nov. 21, 2012

(65) Prior Publication Data

US 2013/0127244 A1 May 23, 2013

(30) Foreign Application Priority Data

Nov. 22, 2011 (JP) ................................. 2011-254576

(51) Int. Cl.
| | |
|---|---|
| *B60L 1/00* | (2006.01) |
| *B60W 10/26* | (2006.01) |
| *B60W 10/30* | (2006.01) |
| *B60W 30/188* | (2012.01) |
| *B60W 20/00* | (2006.01) |
| *B60K 6/48* | (2007.10) |

(52) U.S. Cl.
CPC . *B60L 1/00* (2013.01); *B60L 1/006* (2013.01); *B60W 10/26* (2013.01); *B60W 10/30* (2013.01); *B60W 20/106* (2013.01); *B60W 30/1886* (2013.01); *B60K 6/48* (2013.01); *B60W 2510/305* (2013.01); *B60W 2710/244* (2013.01); *B60W 2710/305* (2013.01); *Y02T 10/6221* (2013.01); *Y02T 10/6269* (2013.01); *Y02T 10/7258* (2013.01)

(58) Field of Classification Search
CPC .............. B60L 1/00; B60L 1/006; H02J 7/00; B60W 10/26; B60W 10/30; B60W 30/1886
See application file for complete search history.

(56) References Cited

U.S. PATENT DOCUMENTS

| | | | |
|---|---|---|---|
| 7,462,951 | B1 | 12/2008 | Baarman |
| 2008/0185197 | A1 | 8/2008 | Nakamura et al. |
| 2010/0164287 | A1 | 7/2010 | Komazawa et al. |
| 2011/0139096 | A1 | 6/2011 | Niimi |

FOREIGN PATENT DOCUMENTS

| | | |
|---|---|---|
| CN | 101277840 A | 10/2008 |
| CN | 102092387 A | 6/2011 |

(Continued)

OTHER PUBLICATIONS

Japanese Office Action, issued on Jun. 30, 2015, in corresponding Japanese Patent Application No. 2011-254576.

*Primary Examiner* — Zeev V Kitov
(74) *Attorney, Agent, or Firm* — Birch, Stewart, Kolasch & Birch, LLP

(57) ABSTRACT

An electricity supply vehicle is provided with an electricity storage device charged with generated energy of an electric generator driven by an internal combustion engine mounted on the electricity supply vehicle or with regenerated energy of the electricity supply vehicle and is operable to supply electricity to an external equipment located outside of the electricity supply vehicle during stop of the electricity supply vehicle. The electricity supply vehicle includes: a setting unit configured to set expected supply electric energy to be supplied to the external equipment; and a determining unit configured to determine, based on the expected supply electric energy, a target charging amount of the electricity storage device to be charged during running of the electricity supply vehicle.

9 Claims, 7 Drawing Sheets

(56) References Cited

FOREIGN PATENT DOCUMENTS

| JP | 2002-354612 | A | 12/2002 |
| JP | 2007-062640 | A | 3/2007 |
| JP | 2008-205927 | A | 9/2008 |
| JP | 2009-248822 | A | 10/2009 |
| JP | 2009248822 | * | 10/2009 | ............ B60W 10/26 |

* cited by examiner

ELECTRICITY SUPPLY VEHICLE

CROSS-REFERENCE TO RELATED APPLICATION(S)

This application is based upon and claims the benefit of priority from prior Japanese patent application No. 2011-254576, filed on Nov. 22, 2011, the entire contents of which are incorporated herein by reference.

BACKGROUND

The presently disclosed subject matter relates to an electricity supply vehicle that is provided with an electricity storage device charged with generated energy of an electric generator driven by an internal combustion engine or with regenerated energy of the vehicle and that supplies electricity to an external equipment located outside of the vehicle during stop of the vehicle.

There is an electric motor vehicle in which an internal combustion engine and an electric motor are mounted and then wheels are driven by one or both of these. In the electric motor vehicle, control is performed such that when the remaining charging rate (the remaining charging amount) of the electricity storage device goes lower during the running, electricity is generated by the electric generator mounted on the vehicle so that the remaining charging rate of the electricity storage device is maintained. For example, JP-A-2002-354612 discloses a technique that altitude information of the route along which the vehicle runs is acquired and then, when the route has an upslope interval, running is performed in such a manner that electricity required for ascending the interval completely is maintained (with generating electricity, when necessary) (for example, see JP-A-2002-354612).

Further, in recent years, techniques have been developed that electricity is taken in from a commercial electricity source having a satisfactory generation efficiency and then charging the electricity storage device of an electric motor vehicle so that the running range of the electric motor is extended and that the occasion of operation of the internal combustion engine is thereby reduced further so that carbon dioxide emission is reduced. Such an electric motor vehicle utilizing also a commercial electricity source is provided with an electricity storage device of larger size than that of an ordinary electric motor vehicle.

Further, in recent years, techniques have been developed that electricity stored in a large-size electricity storage device mounted on an electric motor vehicle is utilized for realizing the use of electric appliances even at places where commercial electricity supply is unavailable. Such a technique permits, for example, the use of electric appliances at a place visited in a trip on the vehicle or at the time of power failure.

On the other hand, even in such vehicles provided with a large-size electricity storage device, when the remaining charging rate (the remaining charging amount) of the electricity storage device goes lower, operation of the internal combustion engine is started so that electricity is generated by the electric generator mounted on the vehicle so as to maintain the remaining charging rate of the electricity storage device. In a case that an external equipment is used at a place visited in a trip on the vehicle, a problem arises that since the usage time of the external equipment is after the running of the vehicle, a sufficient remaining charging rate is not ensured in the battery. When the external equipment is used in a state that the remaining charging rate of the battery is insufficient, electric power generation by the electric generator is started. Nevertheless, this electric generator is driven by a combustion engine, and hence noise, vibration, exhaust gas, and the like are generated. This situation could be unacceptable in the environment where the external equipment is used.

The technique disclosed in JP-A-2002-354612 is for ensuring electricity for running. Thus, the use of an external equipment after running is not taken into consideration. Further, also in common hybrid cars, although a fixed charging rate is always ensured, the ensured charging rate (the target charging rate) is of a fixed value and hence electricity to be used for an external equipment is not ensured. Thus, when an external equipment such as a microwave oven causing large power usage is used, the frequency of the occasion increases that the internal combustion engine is operated so that charging is performed.

SUMMARY

The presently disclosed subject matter may provide an electricity supply vehicle capable of supplying electricity to an external equipment from an electricity storage device mounted on the own vehicle and of maintaining an appropriate electricity storage amount in the electricity storage device.

The electricity supply vehicle that is provided with an electricity storage device charged with generated energy of an electric generator driven by an internal combustion engine mounted on the electricity supply vehicle or with regenerated energy of the electricity supply vehicle and that is operable to supply electricity to an external equipment located outside of the electricity supply vehicle during stop of the electricity supply vehicle, the electricity supply vehicle may comprise: a setting unit configured to set expected supply electric energy to be supplied to the external equipment; and a determining unit configured to determine, based on the expected supply electric energy, a target charging amount of the electricity storage device to be charged during running of the electricity supply vehicle.

The electricity supply vehicle may further comprise: an electric motor capable of being driven with electricity supplied from the electricity storage device; and a judging unit configured to judge, based on a remaining charging amount of the electricity storage device, whether running by a driving force obtained from the electric motor is to be permitted. When the remaining charging amount exceeds the target charging amount, the judging unit may permit the running by the driving force obtained from the electric motor.

The setting unit may include: a selecting unit configured to select the external equipment; and a calculating unit configured to calculate the expected supply electric energy based on information related to the external equipment selected by the selecting unit.

The setting unit may include an input unit configured to input usage time of the external equipment selected by the selecting unit.

The electricity storage device may be capable of being charged also with electricity supplied from an external electricity source.

The electricity supply vehicle may further comprise a conversion apparatus configured to convert electricity charged in the electricity storage device into electricity to be supplied to the external equipment.

The target charging amount of the electricity storage device to be charged during the running may be a first target charging rate in a case that the external equipment is used, and the first target charging rate may be determined by adding a second target charging rate of the electricity storage device in a case that use of the external equipment is not expected to a percentage of the expected supply electric energy to an electricity storage capacity of the electricity storage device.

DETAILED DESCRIPTION OF EXEMPLARY EMBODIMENTS

An embodiment of an electricity supply vehicle according to the presently disclosed subject matter is described below in detail with reference to the accompanying drawings.

Embodiment

Figure 1:
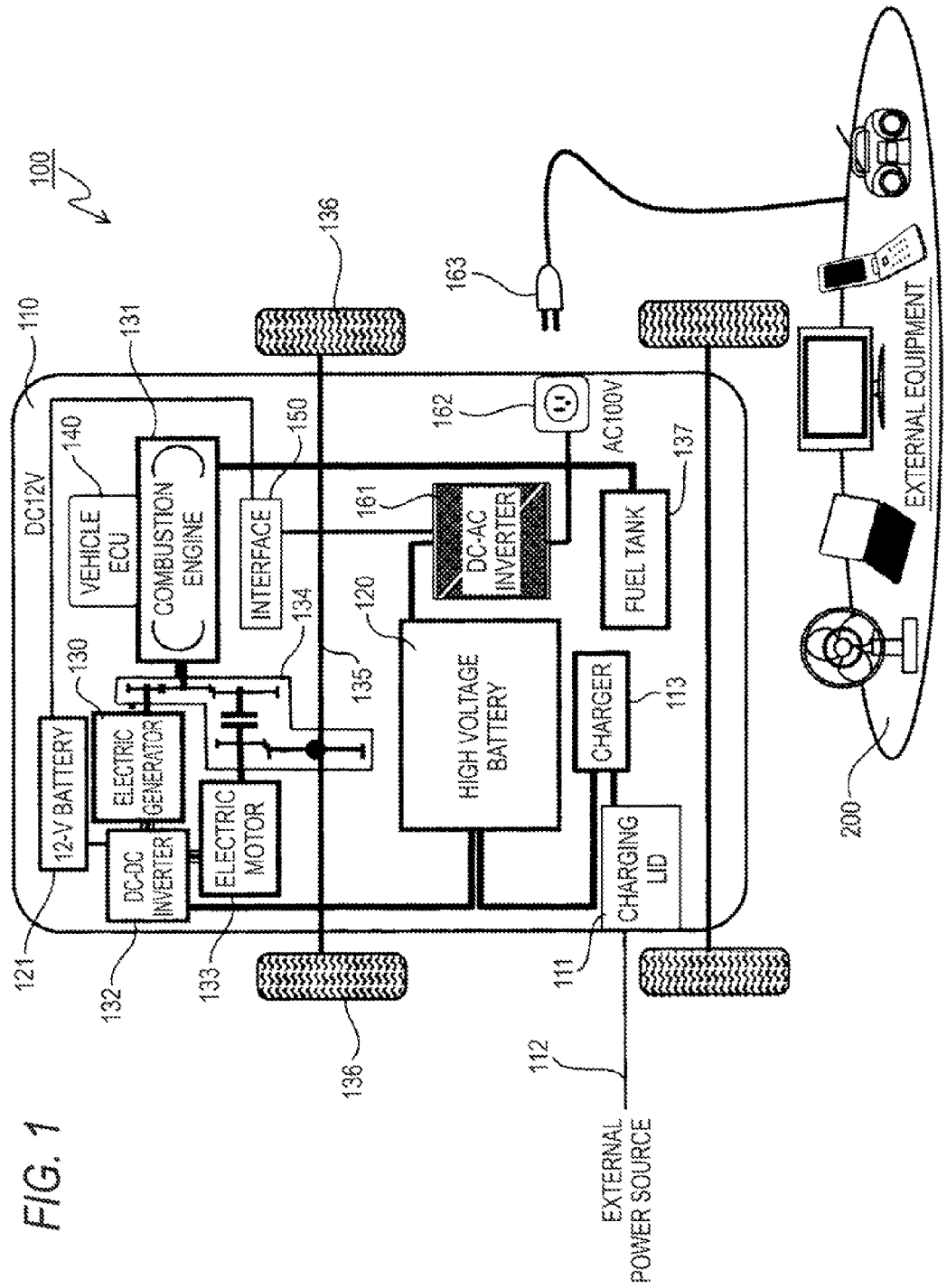
FIG. 1 is an explanation diagram showing a configuration of an electricity supply system 100 according to an embodiment.

FIG. 1 is an explanation diagram showing a configuration of an electricity supply system 100 according to an embodiment. The electricity supply system 100 according to the present embodiment is a system in which electricity is supplied to an external equipment 200 from a high voltage battery 120 (an electricity storage device) mounted on a vehicle 110 (an electricity supply vehicle), which is, for example, a plug-in hybrid vehicle so that the use of the external equipment 200 is permitted. Thus, for example, the use of the external equipment 200 is permitted at a place visited in a trip on the vehicle 110 or at the time of power failure.

The high voltage battery 120 stores two kinds of electricity including: supplied electricity supplied from an external electricity source; and generated electricity generated by an electric generator 130 mounted on the vehicle 110 or obtained as regenerated energy of the vehicle 110. The supplied electricity is supplied from an external electricity source through a charging cable 112 connected to a charging lid 111, and then charged into the high voltage battery 120 through a charger 113.

The generated electricity is obtained by driving the electric generator 130 with a combustion engine 131 (an internal combustion engine). The combustion engine 131 is driven with gasoline stored in a fuel tank 137. Further, the generated electricity may be that generated by the electric motor 133 as regenerated energy of the vehicle 110. The generated electricity generated by the electric generator 130 is stored into the high voltage battery 120 through a DC-DC inverter 132. Further, the generated electricity generated by the electric generator 130 is stored similarly into a 12-V battery 121 through the DC-DC inverter 132. The electricity stored in the 12-V battery 121 is used for the control of a vehicle ECU 140 and an interface 150 described later.

The electricity stored in the high voltage battery 120 is used also for the external equipment 200 as described above. However, this electricity is intrinsically for driving the vehicle 110. In this case, the electricity stored in the high voltage battery 120 is supplied through the DC-DC inverter 132 to the electric motor 133 so as to revolve the electric motor 133. The revolution of the electric motor 133 drives a drive mechanism 134. Then, an axle 135 is revolved, and then wheels 136 are revolved. As a result, the vehicle 110 runs. Further, the wheels 136 may be revolved by the driving of the combustion engine 131. In the flowing description, a case that the wheels 136 are revolved by the driving of the electric motor 133 is referred to as "electric motor running", and a case that the wheels 136 are revolved by the driving of the combustion engine 131 is referred to as "combustion engine running".

When the electricity stored in the high voltage battery 120 is to be used for the external equipment 200, a power source plug 163 of the external equipment 200 is inserted to an electric outlet 162 connected through a DC-AC inverter 161 (a conversion apparatus) to the high voltage battery 120, so that electricity supply is achieved. The DC-AC inverter 161 converts the electricity stored in the high voltage battery 120 into electricity usable in the external equipment 200. A 100-V alternate current (AC) is supplied from the electric outlet 162. The operation of the DC-AC inverter 161 is controlled by the interface 150.

The vehicle ECU 140 includes: a CPU; a ROM for storing a control program and the like; a RAM serving as an operating area of the control program; an EEPROM for retaining various kinds of data in a rewritable manner; and an interface section serving as an interface with peripheral circuits and the like.

Figure 2:
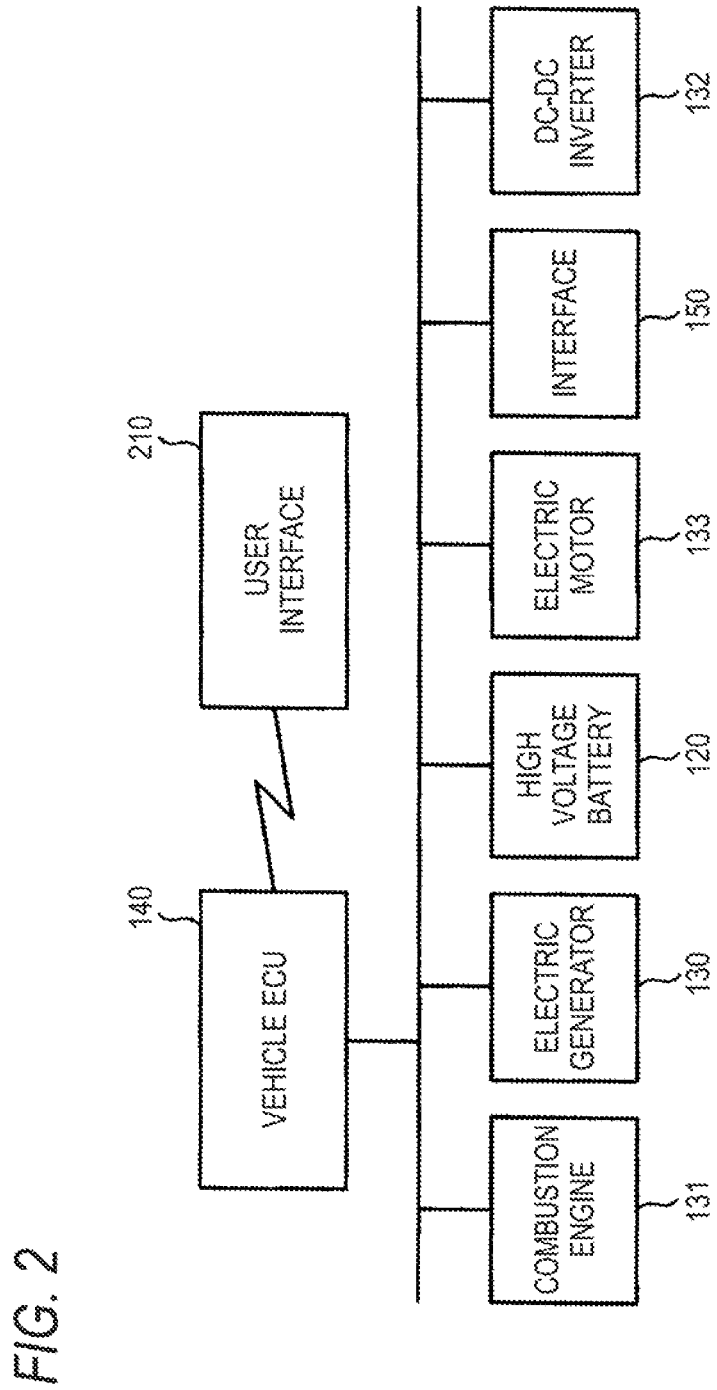
FIG. 2 is a block diagram showing connection between a vehicle ECU 140 and each section of a vehicle.

FIG. 2 is a block diagram showing connection between the vehicle ECU 140 and each section of the vehicle. Although not shown in FIG. 1, the vehicle ECU 140 is connected through the interface section to the combustion engine 131, the electric generator 130, the high voltage battery 120, the electric motor 133, the interface 150, and the DC-DC inverter 132, and exchanges information to and from these sections so as to control the individual sections.

Further, the vehicle ECU 140 is connected to a user interface 210 for receiving setting input from the user. For example, the user interface 210 is composed of a navigation device mounted on the vehicle or of a portable telephone terminal, a smart phone, or the like owned by the user. The connection between the vehicle ECU 140 and the user interface 210 may be of cable or of wireless. In case of wireless, data exchange is performed by using a receiver or the like not shown.

The user interface 210 receives the type and the expected usage time of the external equipment 200. For example, the expected usage time to be inputted is the expected usage time of the electric outlet 162, that is, the expected usage time of the DC-AC inverter 161. Alternatively, for example, the expected usage time of a particular equipment (such as a television receiver, a personal computer, and a radio cassette recorder) to be used may be inputted.

Figure 3:
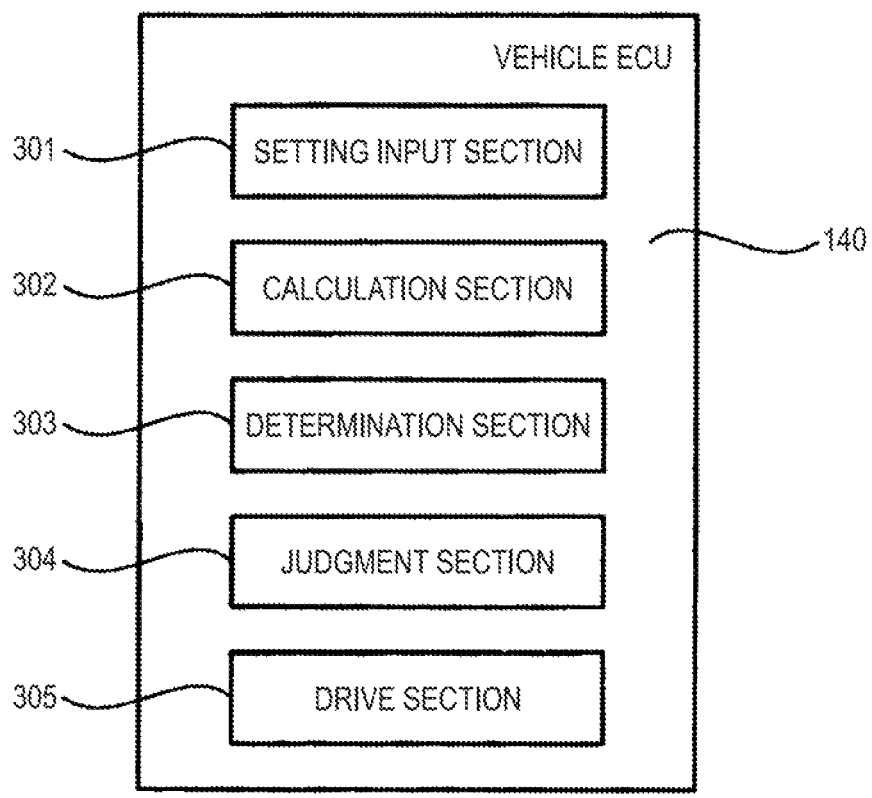
FIG. 3 is a block diagram showing a functional configuration of a vehicle ECU 140.

Further, when the above-mentioned CPU executes the above-mentioned control program, the vehicle ECU 140 implements a setting input section 301 (a selecting unit and an input unit), a calculation section 302 (a calculating unit), a determination section 303 (a determining unit), a judgment section 304 (a judging unit), and a driving section 305 shown in FIG. 3.

FIG. 3 is a block diagram showing the functional configuration of the vehicle ECU 140. The setting input section 301 receives setting input of the type and the expected usage time of the external equipment 200. For example, the setting input section 301 receives the setting input of the type and the expected usage time of the external equipment 200, through the user interface 210. Here, as the expected usage time of the external equipment 200, the expected usage time of the DC-AC inverter 161 (the electric outlet 162) may be set up. In this method, the types and the number of external equipments 200 to be used need not be specified. Thus, setting input by the user is achieved easily. Further, when the expected usage electric energy is inputted rather than the expected usage time of the external equipment 200 by the user, it is sufficient that the inputted expected usage electric energy is set up intact. Here, the expected usage electric energy of the external equipment is equal to the expected supply electric energy to be supplied from the vehicle 110 to the external equipment. That is, in the following description, the "expected usage electric energy" has the same meaning as the "expected supply electric energy".

The calculation section 302 calculates the usage electric energy of the external equipment 200. For example, the calculation section 302 calculates the usage electric energy of the external equipment 200 on the basis of the expected usage time having been set and inputted through the setting input section 301. In this case, the calculation section 302 sets up as the expected usage electric energy the product between the maximum output value and the expected usage time of the external equipment 200. The setting input section 301 and the calculation section 302 implements an setting unit.

The determination section 303 determines the target charging rate (or the target charging amount) of the high voltage battery 120 during the running of the vehicle 110, on the basis of the electric energy (the expected supply electric energy) to be supplied to the external equipment 200. The determination section 303 determines the target charging rate, for example, on the basis of the percentage of the expected usage electric energy of the external equipment 200 calculated by the calculation section 302 to the electricity storage capacity of the high voltage battery 120. More specifically, the determination section 303 determines the target charging rate in such a manner that a target charging rate of the high voltage battery in a case that the use of the external equipment 200 is not expected is added to the percentage of the expected usage electric energy to the electricity storage capacity of the high voltage battery 120.

Figure 4:
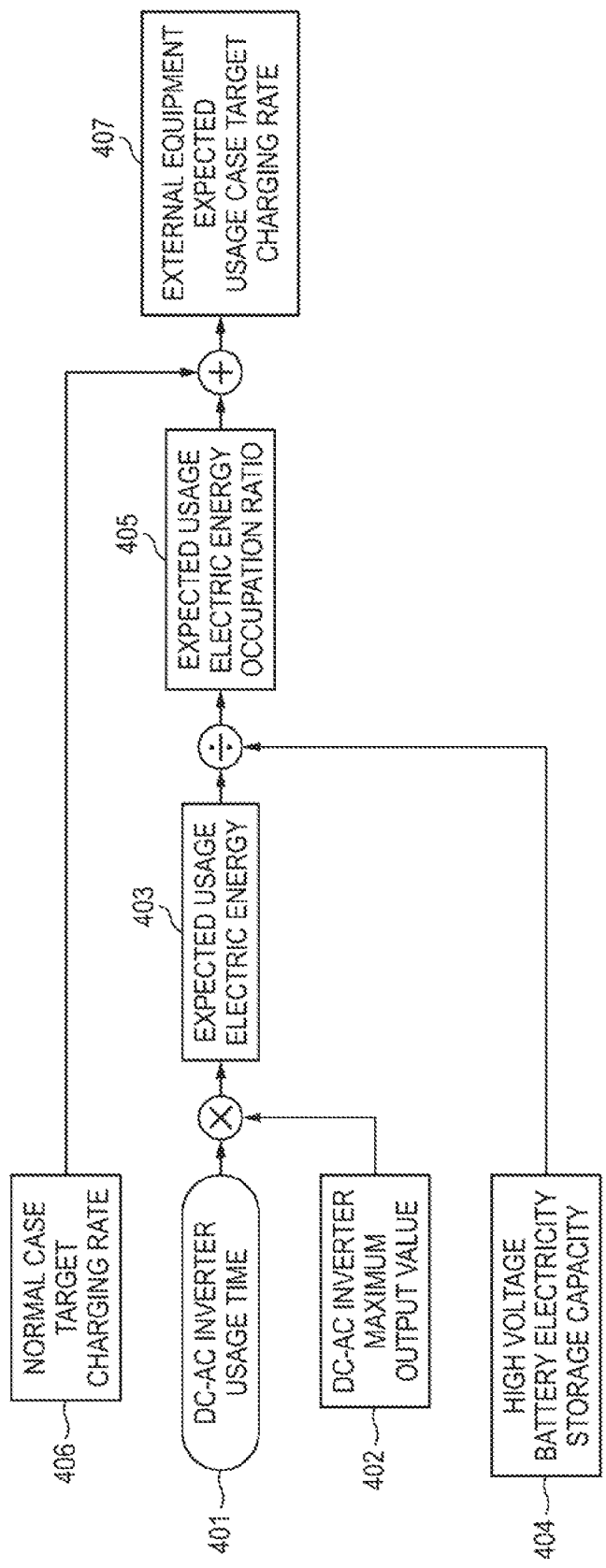
FIG. 4 is an explanation diagram schematically showing a method of calculating a target charging rate performed by a determination section 303.

FIG. 4 is an explanation diagram schematically showing a method of calculating the target charging rate performed by the determination section 303. First, an expected usage time 401 of the external equipment 200 (the DC-AC inverter 161 in this example) is inputted through the user interface 210. Then, since a maximum output value 402 of the DC-AC inverter 161 is known, an expected usage electric energy 403 is obtained by multiplying the maximum output value 402 and the expected usage time 401 (this processing is performed by the calculation section 303 in the present embodiment).

Then, the expected usage electric energy 403 is divided by a value of an electricity storage capacity 404 of the high voltage battery 120. This gives a percentage (an occupancy rate) 405 of the electric energy to be used for the external equipment 200 to the electricity storage capacity of the high voltage battery 120. Then, a target charging rate 406 of the high voltage battery 120 in a case that use of the external equipment 200 is not expected (a normal case) is added to the occupancy rate 405. As a result, a target charging rate 407 in a case that the external equipment 200 is used is determined.

Here, the determination section 303 determines the target charging rate as a value range having a predetermined width. That is, an upper limit and a lower limit are set up for the target charging rate. Then, when the remaining charging rate falls within the range from the upper limit to the lower limit, it is concluded that the necessity target charging rate is satisfied. Further, the target charging rate in a normal case described above is assumed to be similarly set up as a value range having a predetermined width.

Returning to the description of FIG. 3, on the basis of the remaining charging rate (the remaining charging amount) of the high voltage battery 120, the judgment section 304 judges whether running by a driving force obtained from the electric motor 133 is to be permitted. The judgment section 304 monitors, for example, the remaining charging rate of the high voltage battery 120, and permits the running by a driving force obtained from the electric motor 133 until the remaining charging rate goes below the target charging rate. More specifically, the judgment section 304 continuously acquires information on the remaining charging rate from the high voltage battery 120 during the running of the vehicle 110, and then compares the value of the remaining charging rate with the lower limit of the target charging rate so as to judge whether the remaining charging rate is at or above the lower limit of the target charging rate. When the value of the remaining charging rate is at or above the lower limit of the target charging rate, the judgment section 309 permits the running by a driving force obtained from the electric motor 133. In contrast, when the value of the remaining charging rate goes below the lower limit of the target charging rate, the judgment section 304 switches the mode to the running by a driving force obtained from the combustion engine 131 and instructs the driving section 305 to drive the electric generator 130.

When the remaining charging rate goes below the target charging rate, the driving section 305 drives the electric generator 130. More specifically, the driving section 305 drives the electric generator 130 when the remaining charging rate goes below the lower limit of the target charging rate, and then stops driving the electric generator 130 immediately before the remaining charging rate reaches the upper limit of the target charging rate. This avoids excessive electric power generation by the electric generator 130, and thereby improves the fraction of use of electricity supply from an external electricity source having advantages in the efficiency and in carbon dioxide emission.

Further, when the remaining charging rate of the high voltage battery 120 reaches or exceeds the lower limit of the target charging rate as a result of the driving of the electric generator 130, the judgment section 304 permits again the running by a driving force obtained from the electric motor 133. Thus, the operating time of the combustion engine 131 is minimized and carbon dioxide emission from the vehicle 110 is also reduced.

Figure 5:
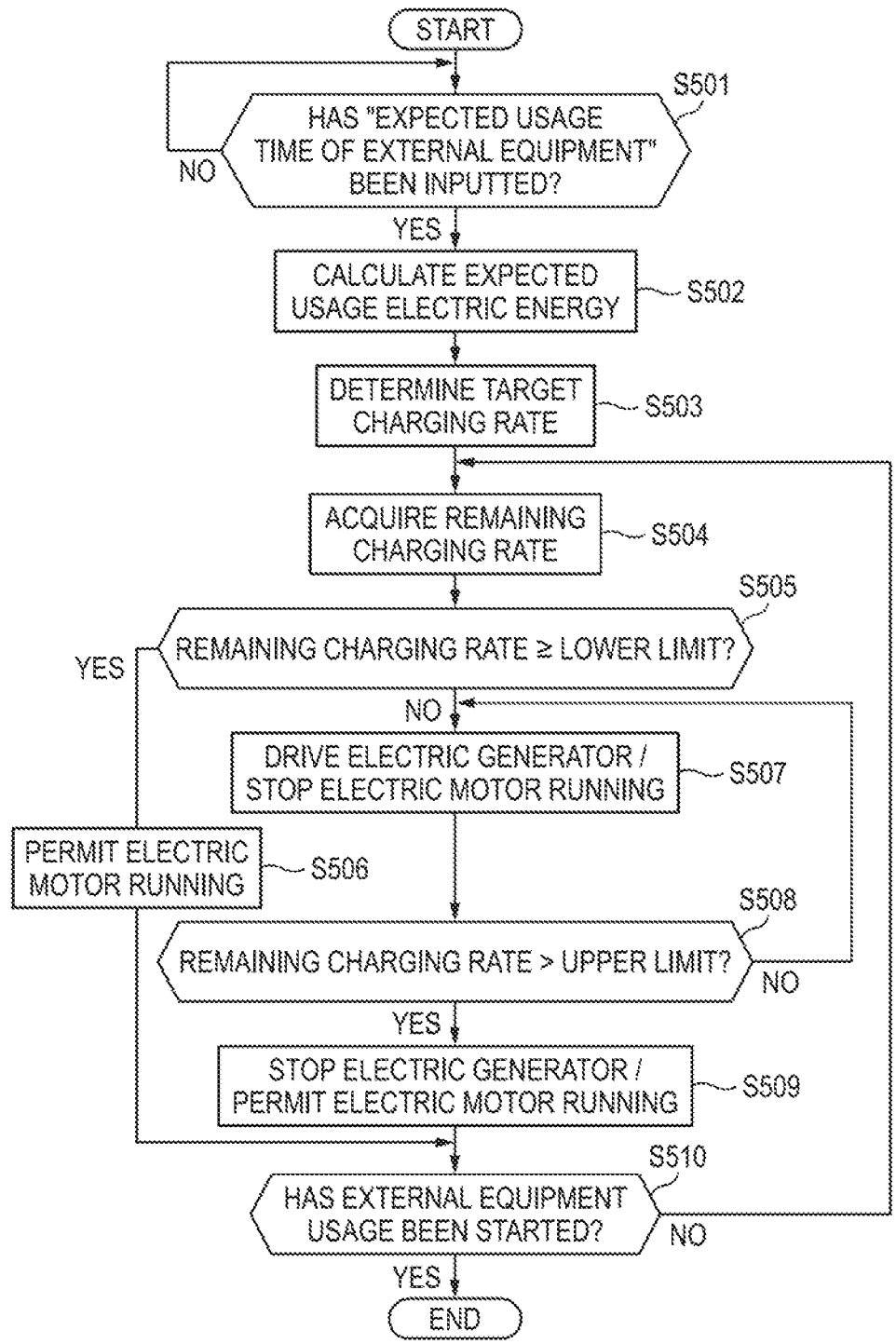
FIG. 5 is a flow chart showing a procedure of electric power generation control processing performed by an electricity supply system 100.

FIG. 5 is a flow chart showing a procedure of electric power generation control processing performed by the electricity supply system 100. In the flow chart of FIG. 5, the electricity supply system 100 first waits until the expected usage time of the external equipment 200 is inputted through the user interface 210 (step S501: Loop of No). When the expected usage time is inputted (step S501: Yes), in the electricity supply system 100, the calculation section 302 calculates the expected usage electric energy of the external equipment 200 (step S502).

Then, in the electricity supply system 100, the determination section 303 determines the target charging rate for a case that the external equipment 200 is used (step S503). Then, in the electricity supply system 100, the judgment section 304 acquires the remaining charging rate of the high voltage battery 120 (step S504), and then judges whether the remaining charging rate is at or above the lower limit of the target charging rate (step S505).

When the remaining charging rate is at or above the lower limit of the target charging rate (step S505: Yes), the judgment section 304 permits the running by a driving force obtained from the electric motor 133 (the electric motor running) (step S506). On the other hand, when the remaining charging rate is below the lower limit of the target charging rate (step S505: No), the judgment section 304 stops the electric motor running and causes the driving section 305 to drive the electric generator 130 (step S507). Until the remaining charging rate exceeds the upper limit of the target charging rate (step S508: Loop of No), driving section 305 continues driving the electric generator 130. Then, when the remaining charging rate exceeds the upper limit of the target charging rate (step S508: Yes), the driving section 305 stops driving the electric generator 130 and the judgment section 304 permits again the electric motor running (step S509).

In the electricity supply system 100, until the use of the external equipment 200 is started (step S510: No), the procedure returns to step S504 and hence the subsequent processing is repeated. Then, when the use of the external equipment 200 is started (step S510: Yes), the processing shown in the present flow chart is terminated.

Figure 6:
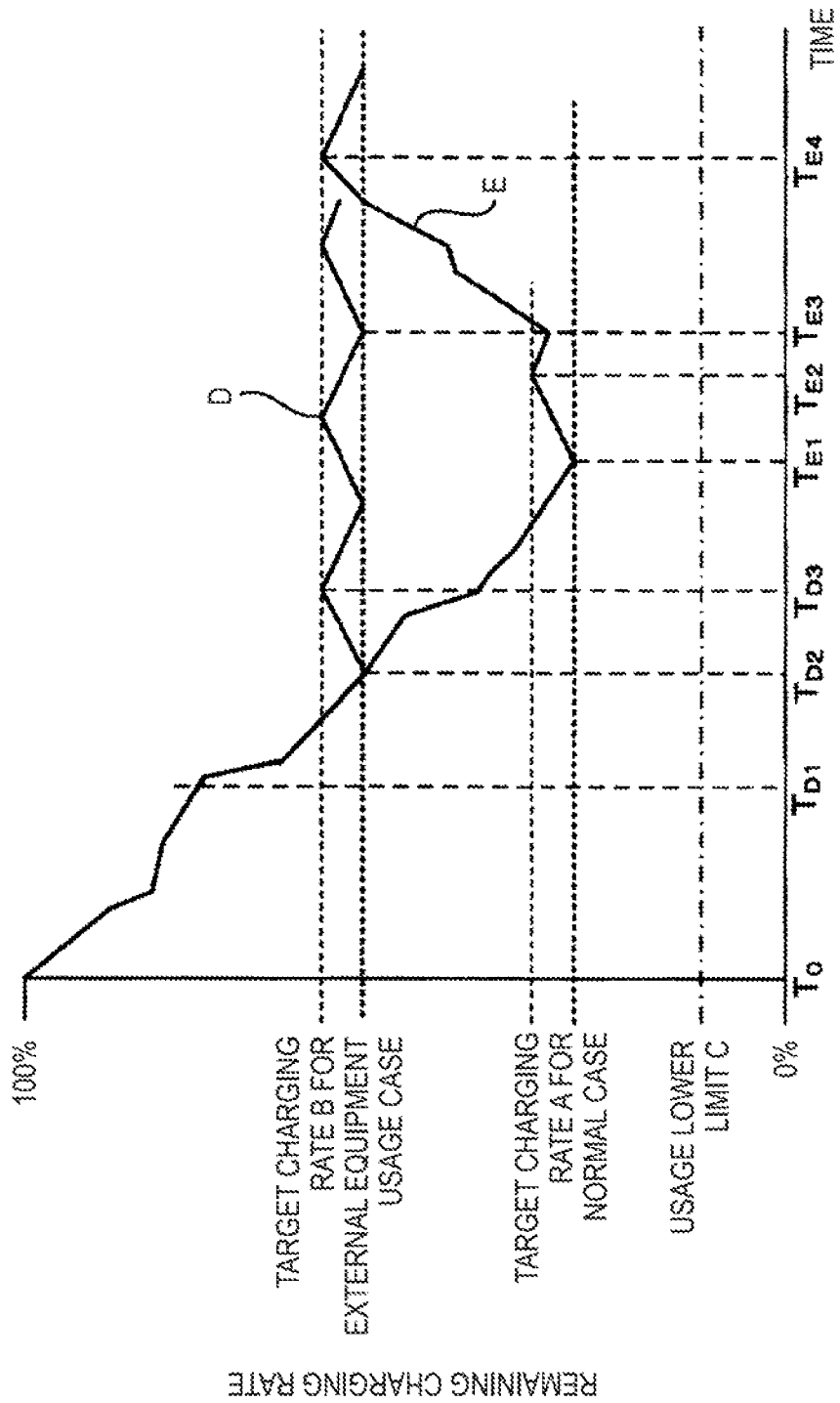
FIG. 6 is a graph showing an example of a remaining charging rate of a high voltage battery 120.

FIG. 6 is a graph showing an example of the remaining charging rate of the high voltage battery 120. In the graph of FIG. 6, the vertical axis indicates the remaining charging rate, and the horizontal axis indicates the time of day. This graph shows a time-dependent change in the remaining charging rate in a case that running is started at time T0. The vertical axis is marked with: the target charging rate A in a normal case (in a case that use of the external equipment 200 is not expected); and the target charging rate B in a case that the external equipment 200 is used. Each of the target charging rate A and the target charging rate B is set up as a value range having a predetermined width. Here, the usage lower limit C indicates a value where the use of the vehicle 110 is not allowed when the remaining charging rate goes below this value.

FIG. 6 shows a sequence D and a sequence E. The sequence D and the sequence E have mutually different timings of expected usage setting (step S501 of FIG. 5) for the external equipment 200. In the sequence D, expected usage setting for the external equipment 200 is performed soon after the start of running, that is, at a timing (time TD1) that the remaining charging rate is relatively high. On the other hand, in the sequence E, expected usage setting for the external equipment 200 is performed when a certain time has elapsed after the start of running, that is, at a timing (time TE3) that the remaining charging rate is relatively low.

In the sequence D, after the expected usage setting, electric power generation by the electric generator 130 is started at a timing (time TD2) that the remaining charging rate goes down to the lower limit of the target charging rate B for external equipment usage case. Then, when the remaining charging rate goes up to the upper limit of the target charging rate B (time TD3), the electric generator 130 is stopped. In the electricity supply system 100, such processing is repeated so that the remaining charging rate is maintained within the range of the target charging rate B.

On the other hand, in the sequence E, at time TE1, the remaining charging rate is already at the lower limit of the target charging rate A for normal case. Thus, electric power generation by the electric generator 130 is started. Then, when the remaining charging rate goes up to the upper limit of the target charging rate A (time TE2), the electric generator 130 is stopped. Further, at time TE3, when expected usage setting for the external equipment 200 is performed, the remaining charging rate at the time is below the lower limit of the target charging rate B for external equipment usage case. Thus, electric power generation by the electric generator 130 is started immediately. Then, when the remaining charging rate goes up to the upper limit of the target charging rate B (time TE4), the electric generator 130 is stopped. After that, control is performed such that the remaining charging rate is maintained within the range of the target charging rate B.

Here, in FIG. 6, in both of the sequence D and the sequence E, expected usage of the external equipment 200 is set up after the start of running of the vehicle 110. Instead, expected usage setting for the external equipment 200 may be performed before the start of running of the vehicle 110. In this case, the control of maintaining the remaining charging rate within the range of the target charging rate B is started immediately after the running start.

As described above, on the basis of the expected usage electric energy of the external equipment 200, the electricity supply system 100 according to the present embodiment charges the high voltage battery 120 during the running. Thus, in the course that electricity is supplied to the external equipment 200 during the stop of the vehicle, the combustion engine 131 need not be operated. Thus, unnecessary operation of the electric generator 130 is avoided. Accordingly, the external equipment 200 can be used without being disturbed by noise or vibration. Further, generation of exhaust gas from the combustion engine 131 is avoided. Thus, the vehicle and the external equipment 200 can be used in a closed space. That is, electricity supply is achieved at an arbitrary place.

Further, in the electricity supply system 100, when a sufficient margin is present in the electric energy of the high voltage battery 120, running by the electric motor 133 is permitted and hence the occasion of operation of the combustion engine 131 is reduced. Thus, carbon dioxide emission is reduced. Further, the target charging rate is calculated from the electric energy to be used by the external equipment 200, and then charging is performed in correspondence to this. This reduces unnecessary operation of the combustion engine 131 and hence reduces carbon dioxide emission.

Further, in the electricity supply system 100, the high voltage battery 120 can be charged from an external electricity source. This permits suppression of the occasion of electric power generation by the combustion engine 131. Furthermore, running by the electric motor 133 is permitted until the electricity storage amount goes below the target charging amount. This reduces further the occasion of operation of the combustion engine 131 and hence remarkably reduces carbon dioxide emission. Further, in the electricity supply system 100, the apparatus for converting electricity into commercial electricity is mounted on the vehicle. Thus, this vehicle realizes any-place use of the external equipment 200 operating by commercial electricity, and realizes electricity supply anywhere even on the occasion of disaster or the like.

Here, in the present embodiment, the electric supply interface to the external equipment 200 has been provided in the car body of the vehicle 110. Instead, the electric supply interface may be in the form of a stand-alone apparatus. Even in this configuration, control of the electric generator is achieved according to processing similar to that in the electricity supply system 100 according to the present embodiment.

Figure 7:
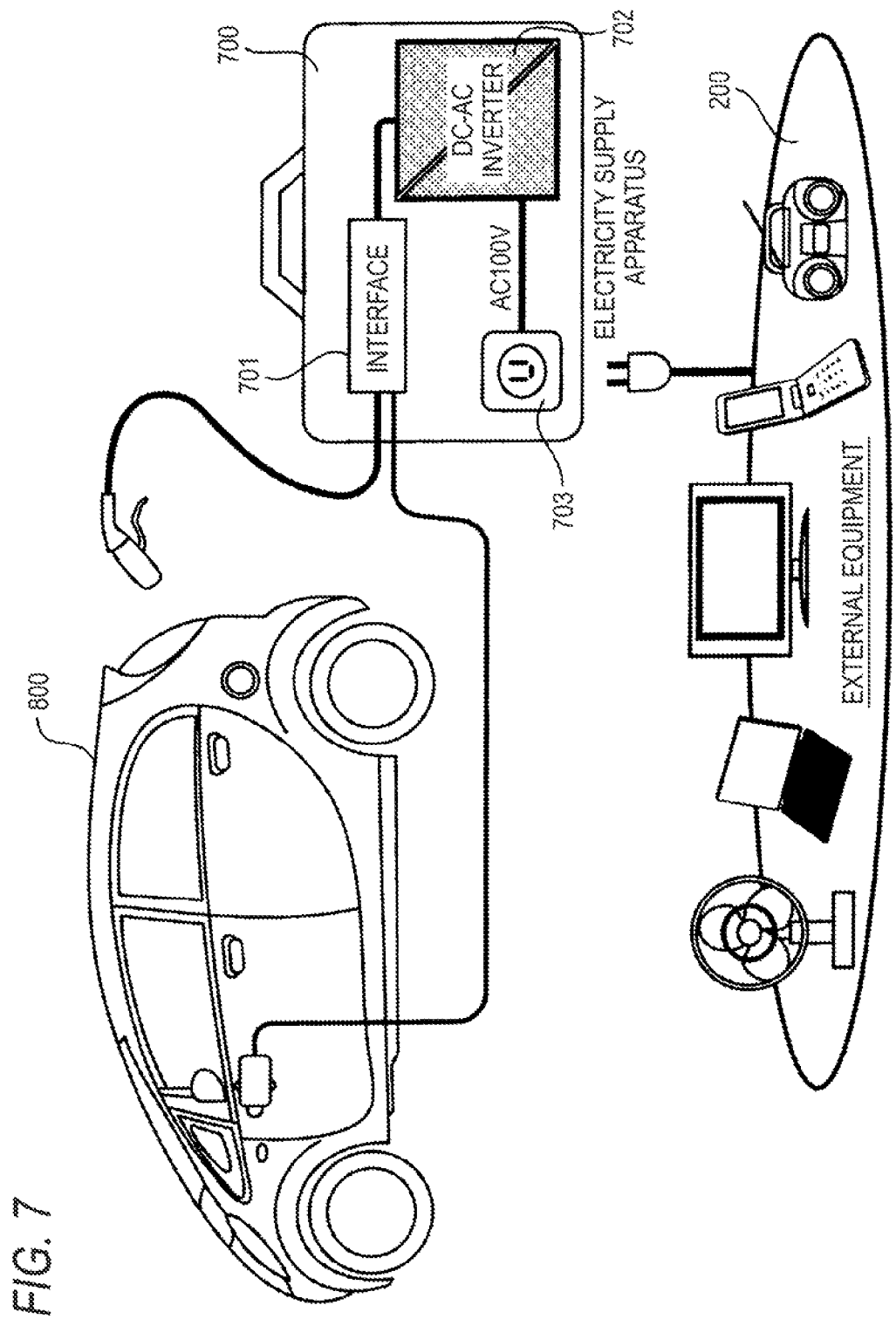
FIG. 7 is an explanation diagram showing an exemplary configuration where an electric supply interface is provided in an external form.

FIG. 7 is an explanation diagram showing an exemplary configuration where an electric supply interface is provided in an external form. The external electric supply interface 700 includes: an interface 701 to a vehicle 800; a DC-AC inverter 702; and an electric outlet 703. The interface 701 receives a high-voltage current from the vehicle 800. The driving electricity for the interface 701 is supplied from a cigar lighter of the vehicle 800. The high-voltage current from the vehicle 800 is supplied through the DC-AC inverter 702 and the electric outlet 703 to the external equipment 200.

According to an aspect of the presently disclosed subject matter, on the basis of the value of expected usage electric energy of the external equipment, the electricity storage device is charged during the running. Thus, the necessity of operating the internal combustion engine is avoided even during the time that electricity is supplied to the external equipment located in the outside of the vehicle during the stop of the vehicle. This avoids unnecessary operation of the electric generator. Thus, the external equipment can be used without being disturbed by noise or vibration. Further, generation of exhaust gas from the internal combustion engine is avoided. Thus, the vehicle and the external equipment can be used in a closed space. That is, electricity supply is achieved at an arbitrary place.

According to an aspect of the presently disclosed subject matter, when a sufficient margin is present in the electric energy of the electricity storage device, running by electric motor is permitted. Thus, the occasion of operation of the internal combustion engine is reduced and hence carbon dioxide emission is reduced.

According to an aspect of the presently disclosed subject matter, the type of the external equipment to be used is specified and then a target charging amount is calculated from the electric energy to be used by the external equipment. Then, charging is performed in correspondence to the calculated value. This reduces unnecessary operation of the internal combustion engine and hence reduces carbon dioxide emission.

According to an aspect of the presently disclosed subject matter, together with the type of the external equipment, the usage time of the equipment is inputted. Thus, the expected supply electric energy is calculated more accurately, and hence unnecessary operation of the internal combustion engine is reduced further.

According to an aspect of the presently disclosed subject matter, the electricity storage device can be charged by an external electricity source. This suppresses the occasion of electric power generation by the internal combustion engine. Further, running by electric motor is permitted until the electricity storage amount goes below the target charging amount. This reduces further the occasion of operation of the internal combustion engine, and hence remarkably reduces carbon dioxide emission.

According to an aspect of the presently disclosed subject matter, an apparatus for converting generated electricity into electricity to be used for external equipments is mounted on a vehicle. This vehicle realizes any-place use of the external equipments, and realizes electricity supply anywhere even on the occasion of disaster or the like.

What is claimed is:

1. An electricity supply vehicle that is provided with an electricity storage device charged with generated energy of an electric generator driven by an internal combustion engine mounted on the electricity supply vehicle or with regenerated energy of the electricity supply vehicle and that is operable to supply electricity to an external equipment located outside of the electricity supply vehicle during stop of the electricity supply vehicle, the electricity supply vehicle comprising:
a setting unit configured to set expected supply electric energy to be supplied to the external equipment; and
a determining unit configured to determine, based on the expected supply electric energy, a target charging amount of the electricity storage device to be charged during running of the electricity supply vehicle, wherein the setting unit includes,
a selecting unit configured to select a type of the external equipment, and
a calculating unit configured to calculate the expected supply electric energy based on a maximum output value of the external equipment selected by the selecting unit.

2. The electricity supply vehicle according to claim 1, further comprising:
an electric motor capable of being driven with electricity supplied from the electricity storage device; and
a judging unit configured to judge, based on a remaining charging amount of the electricity storage device, whether running of the electricity supply vehicle by a driving force obtained from the electric motor is to be permitted, wherein
when the remaining charging amount falls below the target charging amount, the judging unit stops permits the running of the electricity supply vehicle by the driving force obtained from the electric motor and switches to running of the electricity supply vehicle by a driving force obtained from the internal combustion engine.

3. The electricity supply vehicle according to claim 1, further comprising:
an electric motor capable of being driven with electricity supplied from the electricity storage device; and
a judging unit configured to judge, based on a remaining charging amount of the electricity storage device, whether running of the electricity supply vehicle by a driving force obtained from the electric motor is to be permitted,
wherein, when the remaining charging amount exceeds the target charging amount, the judging unit permits the running of the electricity supply vehicle by the driving force obtained from the electric motor, and
wherein the setting unit includes:
a selecting unit configured to select the external equipment; and
a calculating unit configured to calculate the expected supply electric energy based on information related to the external equipment selected by the selecting unit.

4. The electricity supply vehicle according to claim 1, wherein the setting unit includes an input unit configured to input usage time of the external equipment selected by the selecting unit.

5. The electricity supply vehicle according to claim 1, further comprising:
an electric motor capable of being driven with electricity supplied from the electricity storage device; and
a judging unit configured to judge, based on a remaining charging amount of the electricity storage device, whether running of the electricity supply vehicle by a driving force obtained from the electric motor is to be permitted,
wherein, when the remaining charging amount exceeds the target charging amount, the judging unit permits the running of the electricity supply vehicle by the driving force obtained from the electric motor,
wherein the setting unit includes:
a selecting unit configured to select the external equipment; and a calculating unit configured to calculate the expected supply electric energy based on information related to the external equipment selected by the selecting unit, and wherein the setting unit includes an input unit configured to input usage time of the external equipment selected by the selecting unit.

6. The electricity supply vehicle according to claim 1, wherein the electricity storage device is capable of being charged also with electricity supplied from an external electricity source.

7. The electricity supply vehicle according to claim 1, further comprising:

a conversion apparatus configured to convert electricity charged in the electricity storage device into electricity to be supplied to the external equipment.

8. The electricity supply vehicle according to claim 1, wherein the determining unit calculates a first target charging amount, which is a target charging amount to be charged during running of the electricity supply vehicle when the external equipment is expected to be used by adding a second target charging amount, which is a charging amount when use of the external equipment is not expected, to an expected usage electric energy occupation ratio, which is a ratio of an expected usage electric energy expected to be used by the external equipment, with respect to a storage capacity of the electricity storage device.

9. The electricity supply vehicle according to claim 1, further comprising:

an electric motor capable of being driven with electricity supplied from the electricity storage device; and a judging unit configured to judge, based on a remaining charging amount of the electricity storage device, whether running of the electricity supply vehicle by a driving force obtained from the electric motor is to be permitted, wherein the target charging amount includes a value range having a width in which an upper limit and a lower limit are set, when the remaining charging amount is below the lower limit of the target charging amount, the judging unit causes the electric generator to generate electricity with running of the electricity supply vehicle by a driving force obtained from the internal combustion engine, and when the remaining charging amount is above the upper limit of the target charging amount, the judging unit permits the running of the electricity supply vehicle by the driving force obtained from the electric motor.

* * * * *